US006735435B2

United States Patent
Newell et al.

(10) Patent No.: US 6,735,435 B2
(45) Date of Patent: May 11, 2004

(54) METHOD FOR PROVIDING ENTERTAINMENT TO PORTABLE DEVICE BASED UPON PREDETERMINED PARAMETERS

(75) Inventors: Michael A. Newell, Williams Bay, WI (US); Robert F. D'Avello, Lake Zurich, IL (US); Scott B. Davis, Walworth, WI (US)

(73) Assignee: Motorola, Inc., Schaumburg, IL (US)

( * ) Notice: Subject to any disclaimer, the term of this patent is extended or adjusted under 35 U.S.C. 154(b) by 435 days.

(21) Appl. No.: 09/821,975

(22) Filed: Mar. 30, 2001

(65) Prior Publication Data

US 2002/0142764 A1 Oct. 3, 2002

(51) Int. Cl.[7] ................................................. H04M 3/00
(52) U.S. Cl. ....................... 455/419; 455/3.06; 340/988; 463/40
(58) Field of Search ........................... 455/404.2, 414.2, 455/414.3, 418, 422.1, 412.1, 456.1, 457, 3; 463/40–42; 340/539.13, 461, 545.2, 988–990, 991–994, 995.1–995.28

(56) References Cited

U.S. PATENT DOCUMENTS

| 4,162,792 A | * | 7/1979 | Chang et al. ................... 463/4 |
| 5,056,798 A | * | 10/1991 | Wehrley ....................... 273/460 |
| 5,508,731 A | | 4/1996 | Von Kohorn |
| 5,697,844 A | | 12/1997 | Von Kohorn |
| 5,984,311 A | | 11/1999 | Stefanik et al. |
| 5,999,808 A | | 12/1999 | LaDue |
| 6,080,063 A | * | 6/2000 | Khosla ......................... 463/42 |
| 6,148,253 A | * | 11/2000 | Taguchi et al. ................ 701/48 |
| 6,374,179 B1 | * | 4/2002 | Smith et al. ................. 701/207 |
| 6,405,033 B1 | * | 6/2002 | Kennedy et al. ......... 455/414.1 |
| 6,516,466 B1 | * | 2/2003 | Jackson ....................... 725/62 |

FOREIGN PATENT DOCUMENTS

| JP | 09114370 A | 5/1997 |
| JP | 11271420 A | 10/1999 |
| WO | 00/29083 | 5/2000 |
| WO | 01/05476 A1 | 1/2001 |

OTHER PUBLICATIONS

Infogate PRNewswire Source: Sprint, Jan. 30, 2001, PCS Sprint and Unplugged Games, Inc. to Launch New Wireless Games On The Spring PCS Wireless Web, 2 pages.

* cited by examiner

Primary Examiner—William Trost
Assistant Examiner—Joseph Nguyen
(74) Attorney, Agent, or Firm—John J. King; S. Kevin Pickens

(57) ABSTRACT

A unique method for providing entertainment to a portable device, such as a wireless communication device communicating with a host vehicle, is disclosed. The method includes the steps of providing a game to a user of the wireless communication device; receiving game parameters to be used by the user of the wireless communication device; operating the game based upon data associated with the wireless communication device and/or the host vehicle.

20 Claims, 5 Drawing Sheets

METHOD FOR PROVIDING ENTERTAINMENT TO PORTABLE DEVICE BASED UPON PREDETERMINED PARAMETERS

FIELD OF THE INVENTION

The present invention is generally related to portable electronic devices, and more particularly more particularly to a method for providing entertainment to a portable device based upon predetermined parameters.

BACKGROUND OF THE INVENTION

As vehicles such as automobiles have evolved, more entertainment features have been added to make driving more pleasurable. In the early days of the automobile for example, AM radios were added to vehicles to provide entertainment for long distance drives. Such audio systems have improved to include removable media devices, such as cassette players or CD players. In more advanced systems, a display has been incorporated in the vehicle to accommodate even more advanced systems, such as navigation systems.

As the industry continues to develop and wireless communication systems become more common and have greater bandwidth, additional opportunities to provide services to the vehicle are available. One such opportunity includes entertainment systems that enable playing of games in the car. However, there is also a need to provide games that provide additional entertainment than conventional handheld games currently on the market. There is also a need to generate revenue or provide advertisement opportunities based on the location and status of the vehicle.

Accordingly, there is a need for a method for providing entertainment to a portable device, which incorporates parameters from the portable device and/or the vehicle.

DESCRIPTION OF THE PREFERRED EMBODIMENTS

The present disclosure is a method to provide entertainment and competition based on parameters selected by the player (not the driver), provided by the vehicle, and external factors. Preferably, the performance of the game vehicle is directly tied to the actual vehicle performance of a "host" vehicle. A player may choose parameters for the game vehicle (engine, body, 4×4, etc), but the choices have trade offs, e.g., (big engine eats fuel, high performance is less reliable, reliable is slower, 4×4 unstable on sharp turns, etc.). The host vehicle provides data, such as speed, direction, ride, ignition, lights, temperature (air, water, & interior), and communication status to the game. The chosen game car speed, handling performance would all be tied to the host vehicle. Appropriate multipliers for speed, road conditions, gas consumption and other factors would be based on the host vehicle.

The route for the game could be based on the game choice of programmed courses (i.e., Daytona, swamp courses, LeMans, Baja, mountain trails, etc.), based on an anticipated route entered by the player (the start and end points define a distance, and the player would have an event based on that distance), be tied to a destination (tour of Disney World involves the car moving, stopping to swim in pools, etc.), based upon other vehicles, (water craft, such as fan boats, racing boats, ice boats, submarines, etc., such as spacecraft {space race, mars racing, asteroid caroms, etc.}, planes, and other systems). Preferably, the method would require the vehicle to be moving to play. The stops of the host vehicle would then be used for pit stops, food gathering, repairs, provisions, etc. in the virtual world. If a gas-guzzler was chosen, and went fast on a race, it could run out of gas and have to wait for the host to stop to get refueled, as an opponet's economy car putts merrily to the finish line.

Obstacles could include bumps (measured by shocks or an accelerometer), locked tires, wiper activity, excessive speed, and other similar events. The game should be consistent for siblings in a car, but when the game is shared with other players, on different routes, the game becomes even more interesting. Taking inputs from the outside world will expand as a dedicated short range communication (DSRC) type data provides travel conditions, emergency events, and speed limit availability. This would allow the game to pit during an emergency vehicle encounter, lose points or have problems when speeding, and various other scenarios. Weather radio reports could impact game conditions. Accordingly, data from the vehicle itself is not self-contained, and can be modified by the communication capabilities in the vehicle. The breadth of activities is very large, but a main feature includes connecting vehicle features with a game or contest. The more elaborate the vehicle, the more options available.

Figure 1:
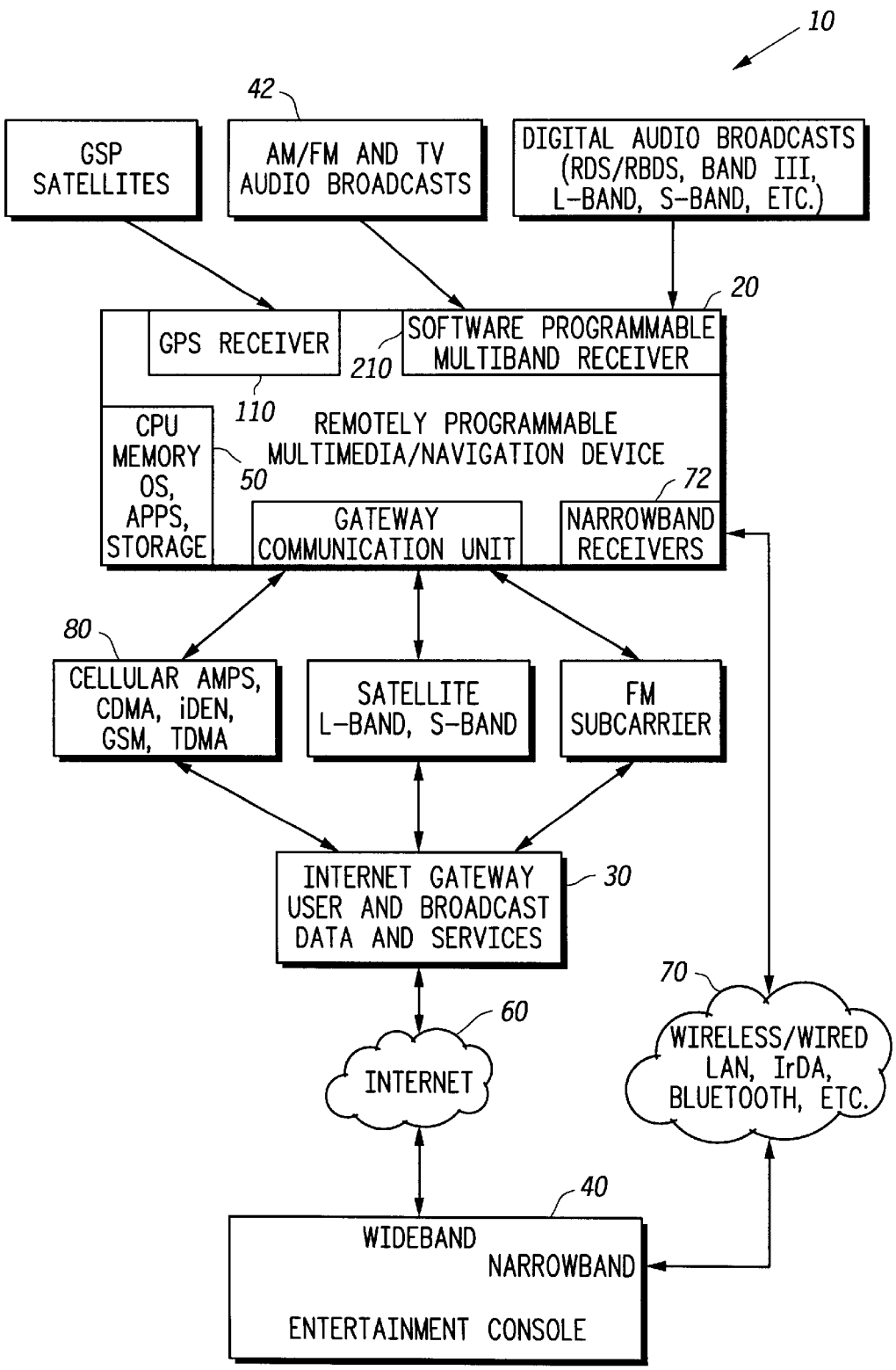
FIG. 1 is a block diagram of a system overview for providing entertainment to a vehicle.

Turning first to FIG. 1, where like elements receive like reference numerals throughout, a computer controlled multimedia entertainment and information system 10. enables enriched audio broadcasts, personalized information services, integrated access to personal and recorded data, enhanced navigation services and other software expandable services, such as providing games and other entertainment in a vehicle through the use of a wireless Internet connection to an enabling Internet gateway network. As shown in FIG. 1, a remotely programmable, microcomputer controlled multimedia device 20 in a vehicle with a wireless IP address for Internet access, an Internet gateway network 30 that provides programming, information and Internet access to the multimedia device 20, and one or more entertainment consoles 40. The entertainment console(s) 40 are preferably connected to the multimedia device 20 by way of communication network 70, which could either be a wired or wireless connection, such as a LAN, Irda, Bluetooth or other connection. Entertainment console 40 could also communicate with multimedia device 20 by way of internet 60. While such an entertainment console for performing the method of the present invention could find particular application in a vehicle, such methods disclosed in the present invention could be performed on a variety of devices, including portable devices, such as wireless communication devices.

The multimedia device 20 includes a computer 50 that preferably runs an operating system and series of applications that control the operation of the device 20. A user operates an application by tuning to a "channel" in keeping with the known radio paradigm and its user friendly operations. The two types of channels preferably available are audio broadcasts (e.g., AM, FM, TV, digital, Internet audio broadcasts and recorded material) and personal information services (e.g., navigation, email, traffic alerts, etc.). Channels are organized in a hierarchy 158 so any one can be easily selected on screen (see FIG. 2). Audio broadcast channels 42 are organized by the format of the broadcast (i.e., country, rock, talk, etc.) and not by the band or frequency of the station. The listener configures the organization of the channels through a remote device 40 via the Internet gateway network 30.

The Internet gateway network 30 is designed to transmit and receive critical information to and from a multimedia device 20 in the vehicle 184. Information transmitted preferably includes broadcaster identification that allows the multimedia device 20 to tune to stations by their formats, direct Internet access for streaming audio broadcasts and other Internet content, broadcast advertising database lookup for direct response to advertisements heard in a vehicle, navigation services, delayed digital personalized broadcasts, personal information event notices, and application downloads to create new personal information channels.

An entertainment console 40, such as a wireless communication device connected to the Internet 60, are used to download information from the Internet gateway network 30. Entertainment console 40 can also be used to provide software, such as games and information and/or data from the Internet gateway 30 to the multimedia device 20, and can retrieve information from the gateway 30 that he has stored there from the vehicle 184. In particular, wireless games or information and/or data for such games can be downloaded to a vehicle or a portable device according to the present invention. While FIG. 1 shows many possible wireless communication methods between the vehicle device and the gateway, as those skilled in the art will appreciate, the methods illustrated in FIG. 1 are meant to be representative and do not reflect all possible wireless communication methods that may be employed.

Figure 2:
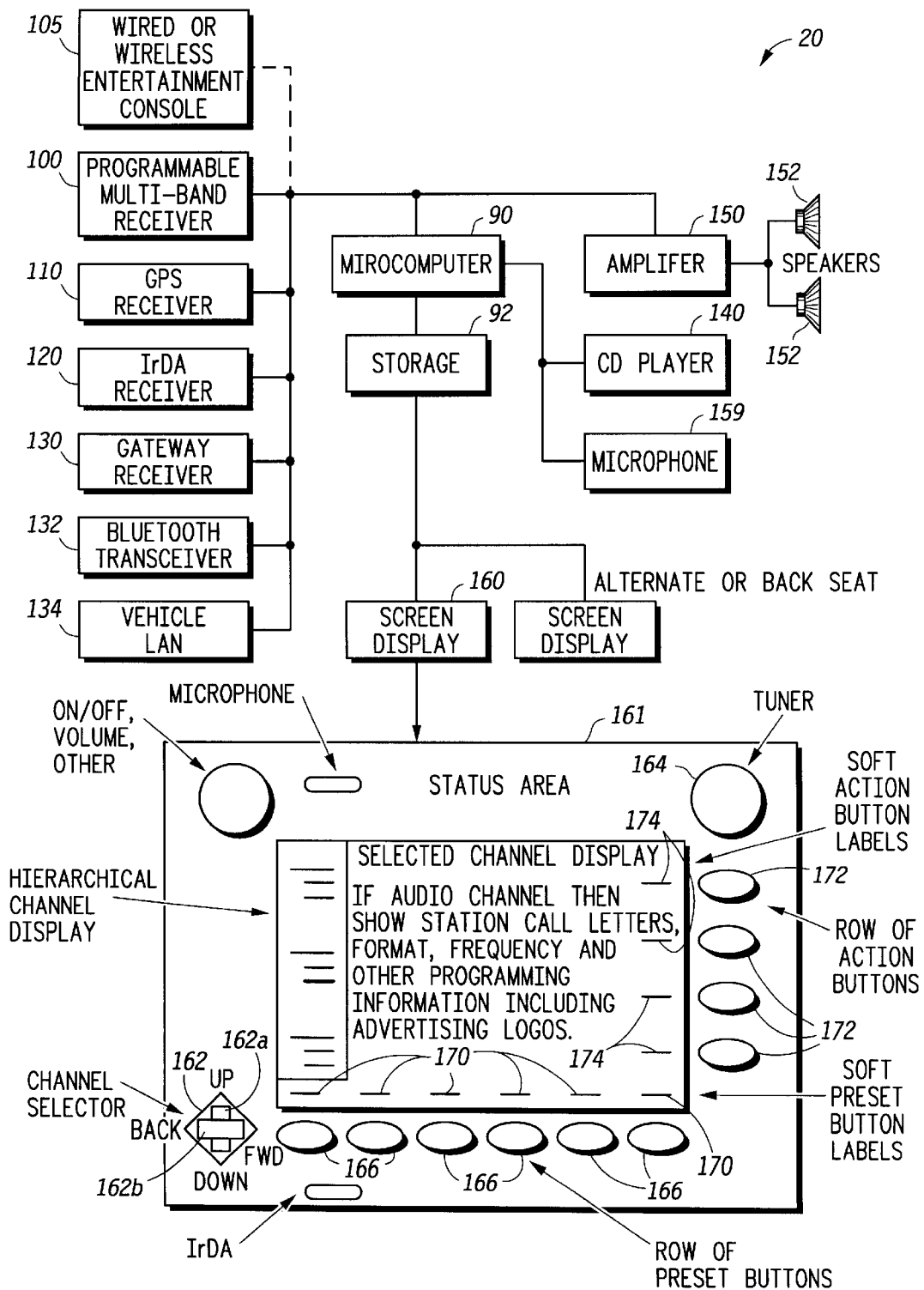
FIG. 2 is a block diagram of a vehicle multimedia receiver for providing entertainment in a vehicle.

Also according to FIGS. 1 and 2, the multimedia device 20 consists of computer 50 preferably having a microprocessor and memory 90, and storage devices 92 that contain and run an operating system and applications to control and communicate with four receivers, such as: a software controlled multi-band AM, FM, TV audio and digital audio broadcast receiver 100; a wired or wireless entertainment console 105; a geographical positioning device, such as a GPS receiver 110 that continuously reports the vehicle's longitude, latitude and altitude; one or more high-speed, narrow band wireless transceivers 120 for fast transmission and reception of large amounts of data from accommodated devices; and a wide band wired or wireless Internet addressable gateway transceiver 130 to receive Internet protocol based audio broadcasts, new applications known as information or data channels, and configuration data from a gateway network 30 created to service the multimedia devices 20. The in-vehicle wireless gateway transceiver 130 can also send information to the gateway network 30 such as requests for navigation data, advertisement responses, purchase requests, etc. The vehicle multimedia device of FIG. 2 also preferably includes a bluetooth transceiver 132 and a vehicle LAN 134. The multimedia device 20 also controls attached conventional multimedia storage equipment such as a CD/DVD player 140 or cassette player (not shown).

Sound is output through an industry standard amplifier 150 and speakers 152. A microphone 154 allows for voice recognition commands to be given and received by the multimedia device 20. While GPS is cited as one type of geographical positioning device, any other means for determining position, including cellular ID, dead reckoning, delta position (vector) beacon, proximity detectors, etc. could be used.

The multimedia device 20 preferably also contains and controls one or more digital storage devices 92 to which real-time broadcasts can be digitally recorded. The storage devices 92 may be hard drives, flash disks, or other automotive grade storage media. The same storage devices 92 can also preferably store digital data that is wirelessly transferred to the vehicle in faster than real time mode. Examples of such digital materials are MP3 audio files or nationally syndicated radio shows that can be downloaded from the gateway network 30 and played back when desired rather than when originally broadcast.

As FIG. 2 shows, the multimedia device also uses a LCD, LED or similar suitable display screen 160 for an automotive environment to present information to the user and to control the multimedia device 20. Controls shown on the LCD in FIG. 2 are one possible embodiment for control types and location. Those skilled in the art will appreciate that control types and locations may vary in different implementations of the invention. In one presently preferred embodiment, for example, the display screen 160 includes a 5½ inch 640×480, 216 color VGA LCD display 168. In an alternate embodiment, the display can display as little as two lines of text, whereas an upper limit of the screen display 168 can be as large as the intended application may dictate. The channel selector 162, tuner 164 and preset button 166 controls shown in FIG. 2 allow the user to broadly navigate all the channels of audio broadcasts and information services available on the multimedia device 20.

A microphone input 176 on the face of the display 160 allows users to control the multimedia device 20 verbally rather than through the control buttons. Key word recognition software allows the user to make the same channel selections that could be made from any of the button controls. Audio feedback through speech synthesis allows the user to make selections and hear if any other actions are required. Software or hardware based voice recognition and speech synthesis may be used to implement this feature.

Figure 3:
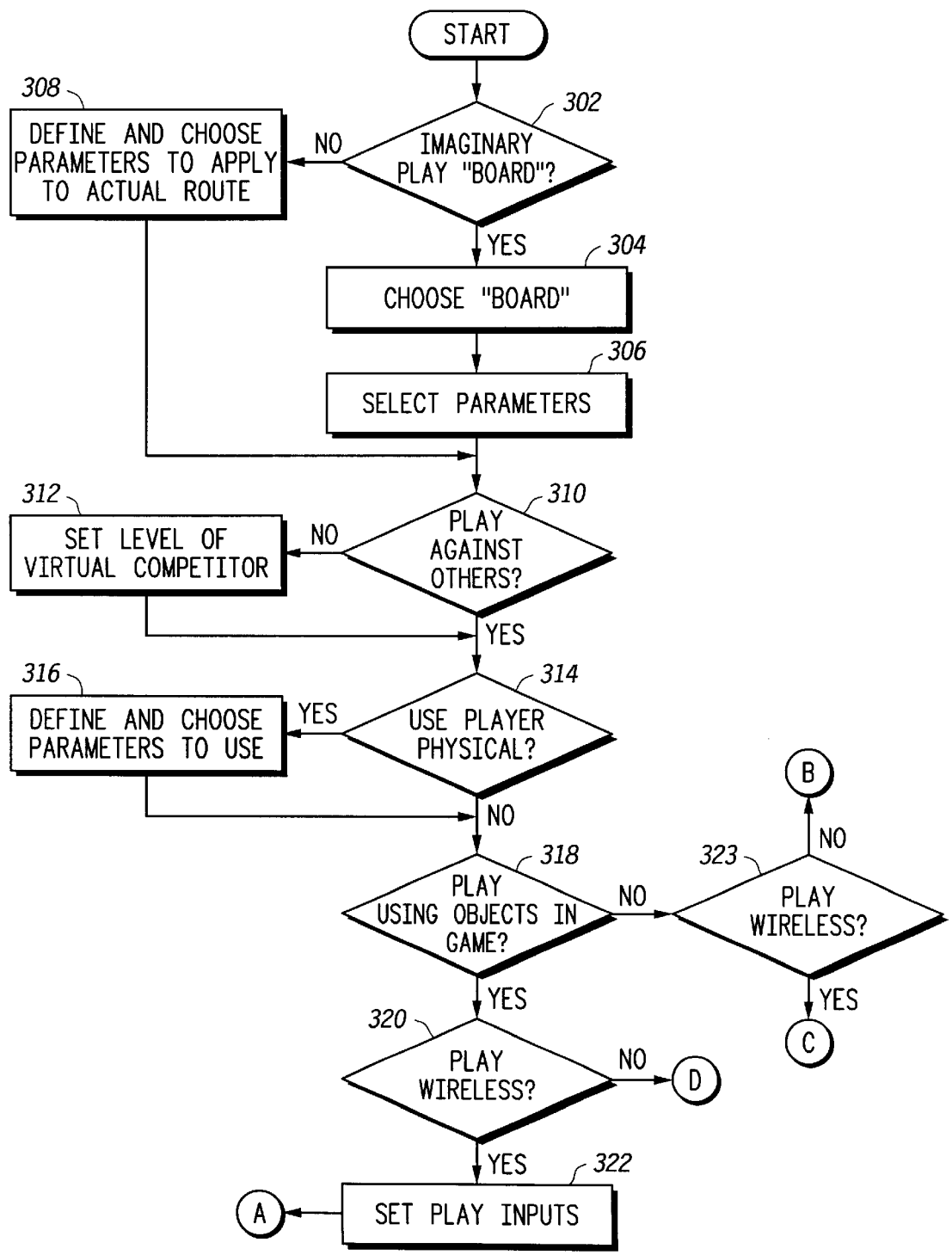
FIG. 3 is a flow chart showing a method for providing entertainment in a vehicle according to a first embodiment of the invention.

Turning now to FIG. 3, it is determined at a step 302 if the user will use the actual movement of the host vehicle, or will want to map the movements to an imaginary game environment. This morphing of motion to an alternate play area can be more clearly shown by the following example. As a person is an occupant in a vehicle, the motion of the vehicle is mapped into an off-road race course complete with rivers, hills, sand, snow, etc, or a submarine mission. A person going for a walk could have the walk transformed into a haunted house or ski slope. If the player decides to use a virtual play area at a step 302, the player preferably chooses the virtual "board" or situation at a step 304. Note that if multiple players are to play the game, they could all play the same course, or could play unique courses of equal difficulty and point capability. The player chooses the parameters for the game (difficulty, type of gear {e.g., stock car or 4×4, rope and hammer, or canteen and whip}, etc.) at a step 306. If the player wants to use the actual area to be traveled in stead of a virtual play area, they define the parameters and limitations to the area (if any) at a step 308. In a cross country road trip, the boundaries would be left open, but a local game with friends may have a defined set of boundaries (geographical and/or time).

It is now decided if the game will include a single player, or multi-player game at a step 310. If it is multi-player game, the other players will be contacted or allowed to enter (as in a continuing game cross country). If single player is chosen, the player sets the level of the virtual competitor at a step 312. The virtual competitor could be set to be removed from the game, or set to be almost unbeatable. The next decision to prepare for play is to determine if the player wants to use physical parameters while playing at a step 314. These parameters are in addition to location and include (but are not limited to) temperature, velocity, fuel level, accelerometer, altitude, light, temperature of various elements, speed, wiper status, etc. Note some could be from a connection to a vehicle, to devices on the person, or areas totally unrelated (e.g., player in North Dakota using the temperature in Honolulu). The parameters are chosen and weighted at a step 316. It is then determined if the player wants to be able to place objects in the game zone at a step 318. For example, objects could be treasures, bombs, mines, etc. The details on these objects will be defined later, and can provide positive or negative results.

If objects are used, the next decision is whether to use wireless technologies to play (e.g., cellular phone, pager, etc.), or to play without wireless connection at a step 320. Playing without a wireless connection can be done with a device that stores information on objects, events, etc and are downloaded at the end of the game (such as a GPS unit or PDA), or compared some other way (e.g., visual). If the decision is to play wireless, the play inputs are set at a step 322. These inputs could include the type of wireless connection to be used. A point-to-point system or a server based collector and distributor of information could be used.

Figure 4:
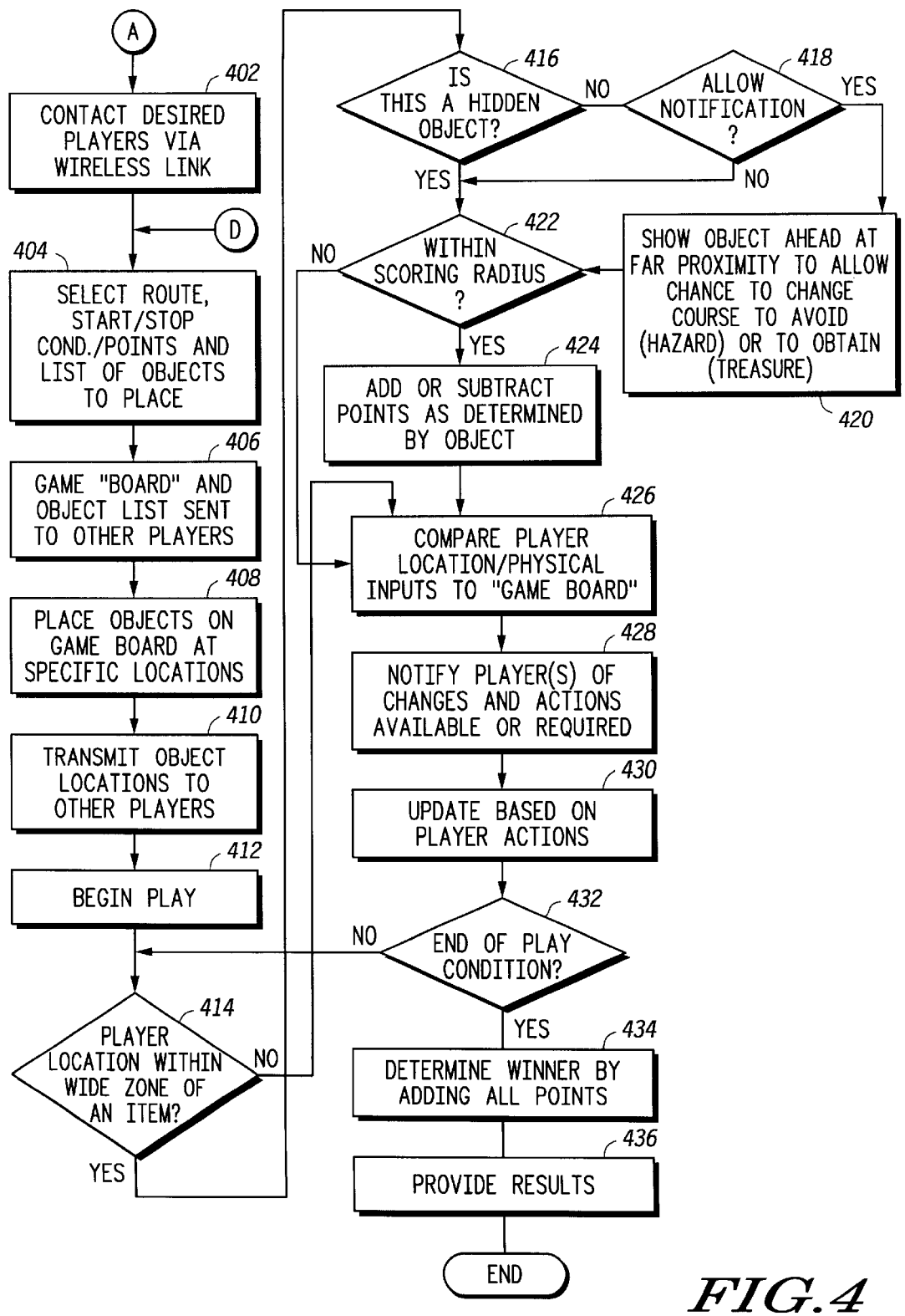
FIG. 4 is a flow chart showing additional features of the method for providing entertainment in a vehicle of FIG. 3.

Continuing on to FIG. 4, the players connect through the wireless link at a step 402 if playing wirelessly. The players could have a pre-arranged game where a password is required to enter the game, or it could be a "pick up" game where players enter and exit at will. The parameters of the game are distributed between players at a step 404. If any conflicts exist they are settled among the players and final boundaries are given to all players at a step 406. The amount and kind of objects that can be placed as well as other equipment limitations (e.g., skis, fuel allowed, defensive items, rooms in haunted house, etc in a virtual game space) would be finalized. Next are objects placed at a step 408. This could be done through a map Internet site, entering of location (address or coordinates), or by traveling the game space and physically locate/place the objects. One variation would require the objects be placed only by being physically present. Objects may be placed uniquely for each player. Object may also be activated for a time window (i.e. treasure is available for only 10 minutes). The determination if the object is multi-use or single use is also done here. Finally, the information about objects is provided to the players at a step 410. This may be done by transferring information to the players game devices, by keeping it in a server data base, or other methods.

Now the fun begins as the game starts at a step 412. The location of the players is compared to the object locations and a determination if the player is within a wide preliminary radius of an object is made at a step 414. If the player is not near an object, the routine jumps to step 426 (to be described later). If the player is in the wide radius, the determination if the object is "hidden" or visible to the player is made at a step 416. if the object is not hidden, it is determined if the player is to be notified that an object is near at a step 418. If the player is notified that an object is near, variations exist as to how much detail is given in 420. The player could be told the exact location and type of object. The player could be told an object is near and what kind of object. The player could be told the exact location, but not what type of object. The player could be told an object is near, but not what type. The player then decides the action to take.

After notification is given at a step 420 or if notification is not given, the play moves to step 422 where it is determined if the object is within the smaller scoring radius. The object is only revealed if the player gets within scoring radius. A possible scenario is that the object was in the wide radius, but never becomes a score radius due to the player changing course. If the player is in the scoring radius, the play would move to a step 424, where points are added or subtracted depending upon this object. An option to the game is to not notify when points are added or subtracted, and then the scoring is done at the end of the game. An alternate is to notify the player an object was encountered, but not the impact. If the person is near the object, then scoring is done, or data logged for scoring at the end of the game. If the player is not within the scoring radius, the play moves to a step 426.

The second part of the game is now handled and the player location is and other data is compared to the virtual or physical game at step 426. The player is notified of the status of the game and if any actions are required or desired (e.g., low fuel, player leaves course for cross country short cut, etc.) at a step 428. The game is updated based on the player actions at a step 430. The end of play conditions are then tested at a step 432. If the conditions have not been met, the game loop repeats at a step 414. If the end conditions have been met, the points are determined at a step 434. This can be a local or networked activity. The results are then provided to players at a step 436, the game then ends.

Figure 5:
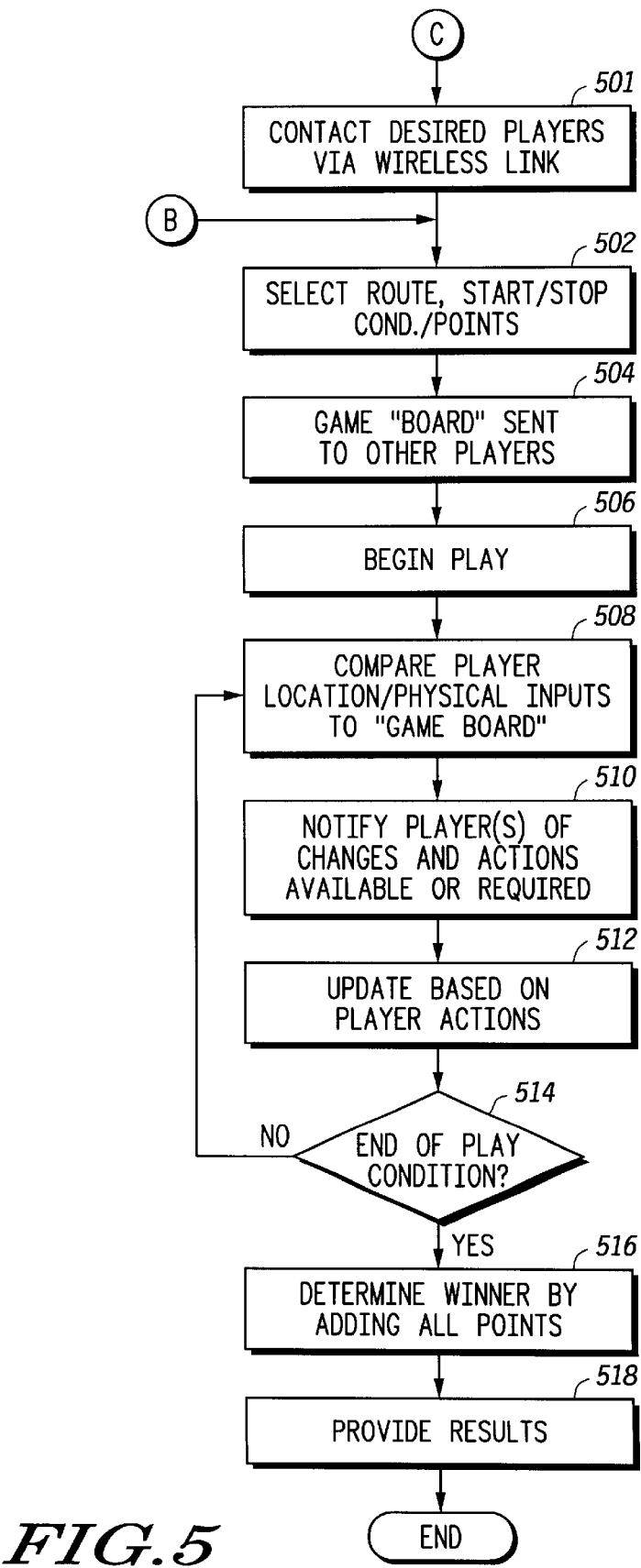
FIG. 5 is a flow chart showing additional features of the method for providing entertainment in a vehicle of FIG. 3.

Continuing now with FIG. 5, the players connect through the wireless link at a step 501. The players could have a pre arranged game where a password is required to enter the game, or it could be a "pick up" game where players enter and exit at will. The parameters of the game are distributed between players in at a step 502. If any conflicts exist they are settled among the players and final boundaries are given to all players at a step 504. The amount and kind of objects that can be placed as well as other equipment limitations (e.g., skis, fuel allowed, defensive items, rooms in haunted house, etc in a virtual game space would be finalized). The information is provided to the players. This may be by transferring to the players game devices, by keeping it in a server data base, or other methods.

Now the fun begins as the game starts at a step 506. The player location and other data are compared to the virtual or physical game at a step 508. The player is notified of the status of the game and if any actions are required or desired (e.g., low fuel, player leaves course for cross country short cut, etc.) at a step 510. The game is updated based on the player actions at a step 512. The end of play conditions are then tested at a step 514. If the conditions have not been met, the game loop repeats at a step 508. If the end conditions have been met, the points are determined at a step 516. This can be a local or networked activity. The results are provided to players at a step 518.

In summary, a unique method for providing entertainment to a wireless communication device communicating with a host vehicle is disclosed, the method including the steps of providing a game to a user of the wireless communication device; receiving game parameters to be used by the user of the wireless communication device; operating the game based upon data associated with the host vehicle. While various parameters from a host vehicle may have one meaning for the host vehicle, they may have a different application for the game. For example, the position sensors associated with the tires of a vehicle having an ABS system could be used to generate a random number or event. A more particular application would be found in the application of position sensors associated with the tires for a slot machine or roulette application. While the methods of the present invention find particular application in connection with portable device communicating with a host vehicle, such methods could be applied to any portable electronic device, including wireless communication devices.

We claim:

1. A method for providing entertainment to a wireless communication device, said method including the steps of:

providing a game to a user of said wireless communication device;

receiving game parameters to be used by said user of said wireless communication device;

operating said game based upon predetermined game parameters associated with a location of said wireless communication device and performance of a host vehicle, wherein the location of the wireless communication device is coupled to a location of the host vehicle.

2. The method of claim 1 wherein said step of receiving game parameters comprises receiving parameters selected by said user of said wireless communication device.

3. The method of claim 1 wherein said step of receiving game parameters comprises receiving game parameters based upon data from sensors in said host vehicle.

4. The method of claim 3 wherein said game includes a vehicle and wherein the performance of said vehicle is based upon the performance of said host vehicle.

5. The method of claim 4 wherein said performance is based upon real time performance of the host vehicle.

6. The method of claim 5 wherein said vehicle is penalized based upon the real time operation of the host vehicle.

7. The method of claim 3 wherein said game parameters include a route associated with the route of the host vehicle.

8. The method of claim 3 wherein said game parameters include obstacles associated with the host vehicle.

9. The method of claim 1 further including a step of receiving parameters based upon real time data received from a remote network.

10. A method for providing entertainment to a portable device communicating with a host vehicle, said method including the steps of:

providing a game to a user of said portable device;

receiving game parameters to be used by said user of said portable device; operating said game based upon predetermined game parameters associated with a location of said host vehicle and performance of the host vehicle, wherein a location of the portable device is coupled to the location of the host vehicle.

11. The method of claim 10 wherein said step of receiving game parameters comprises receiving parameters associated with said host vehicle by way of a wireless network.

12. The method of claim 10 wherein said step of receiving game parameters comprises receiving parameters selected by said user of said portable device.

13. The method of claim 10 wherein said step of operating said game based upon predetermined game parameters associated with said host vehicle comprises operating said game based upon data from sensors in said host vehicle.

14. The method of claim 10 wherein said step of operating said game includes operating a game vehicle in said game and wherein the performance of said game vehicle is based upon the performance of said host vehicle.

15. The method of claim 14 wherein said performance of said game vehicle is based upon real time performance of the host vehicle.

16. The method of claim 15 wherein said game vehicle is penalized based upon the real time operation of the host vehicle.

17. The method of claim 10 wherein said game parameters include a route associated with the route of the host vehicle.

18. The method of claim 10 wherein said game parameters include obstacles associated with the host vehicle.

19. The method of claim 10 further including a step of receiving parameters based upon real time data received from a remote network.

20. A method for providing entertainment to a wireless communication device communicating with a host vehicle, said method including the steps of:

providing a game to a user of said wireless communication device;

receiving game parameters to be used by said user of said wireless communication device;

operating said game based upon predetermined game parameters associated a location of said host vehicle and the performance of the host vehicle, wherein a location of the wireless communication device is coupled to the location of the host vehicle.

* * * * *

UNITED STATES PATENT AND TRADEMARK OFFICE
CERTIFICATE OF CORRECTION

PATENT NO. : 6,735,435 B2  
DATED : May 11, 2004  
INVENTOR(S) : Michael A. Newell et al.

It is certified that error appears in the above-identified patent and that said Letters Patent is hereby corrected as shown below:

Column 8,  
Line 44, after "associated" insert -- with --.

Signed and Sealed this

Seventeenth Day of August, 2004

JON W. DUDAS  
*Acting Director of the United States Patent and Trademark Office*